United States Patent [19]

Hatakeyama

[11] Patent Number: 5,391,635
[45] Date of Patent: Feb. 21, 1995

[54] RUBBER COMPOSITION
[75] Inventor: Kazuya Hatakeyama, Tokyo, Japan
[73] Assignee: Bridgestone Corporation, Tokyo, Japan
[21] Appl. No.: 35,795
[22] Filed: Mar. 23, 1993
[30] Foreign Application Priority Data Mar. 23, 1992 [JP] Japan .................. 4-065273

[51] Int. Cl.⁶ .......................... C08F 8/34; C08C 19/20
[52] U.S. Cl. ................................. 525/352; 524/201; 525/351
[58] Field of Search ................. 524/201; 525/351, 352

[56] References Cited

U.S. PATENT DOCUMENTS

| | | | |
|---|---|---|---|
| 4,965,323 | 10/1990 | Watanabe et al. | 525/352 |
| 5,191,028 | 3/1993 | Ishioke | 525/236 |

FOREIGN PATENT DOCUMENTS

| | | | |
|---|---|---|---|
| 0479526 | 4/1992 | European Pat. Off. | 524/201 |
| 4036420 | 5/1991 | Germany | 524/201 |
| 59-213745 | of 1984 | Japan . | |

Primary Examiner—Paul R. Michl
Assistant Examiner—Olga Asinovsky
Attorney, Agent, or Firm—Sughrue, Mion, Zinn, Macpeak & Seas

[57] ABSTRACT

A rubber composition which comprises
(1) 100 parts by weight of a rubber containing 60 parts by weight or more of styrene-butadiene rubber,
(2) 20 to 180 parts by weight of a softening agent,
(3) 0.5 to 5 parts by weight of at least one member selected from the group consisting of a thiuram compound of the following formula,

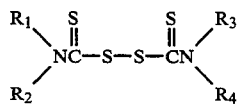

where $R_1$, $R_2$, $R_3$ and $R_4$ are independently selected from the group consisting of straight chain alkyl groups and branched chain alkyl groups having 7 to 12 carbon atoms, and a dithiocarbamate compound of the following formula,

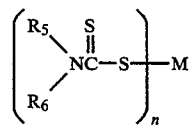

where $R_5$ and $R_6$ are independently selected from the group consisting of straight chain alkyl groups and branched alkyl groups having 7 to 12 carbon atoms, M is a divalent or higher valent metal and n is a number which is the same as the number of the valence of the metal M,
(4) 0.1 to 2.5 parts by weight of a guanidine vulcanization accelerator, and
(5) 0.5 to 5 parts by weight of a benzothiazole vulcanization accelerator.

6 Claims, No Drawings

RUBBER COMPOSITION

FIELD OF THE INVENTION

The present invention relates to a rubber composition suitable for rubber goods such as tires, particularly for tire treads sufficiently satisfying all of the characteristics of vulcanization speed, processing stability, heat resistance and creep resistance, and tires using the rubber composition as a tread with excellent high speed running stability.

BACKGROUND OF THE INVENTION

Heretofore, for purposes of improving the vulcanization property of a vulcanizable rubber composition for various rubber products such as tires and the like, it is known to compound a thiuram compound such as TMTD (tetraethyl-thiuram disulfide) of the formula,

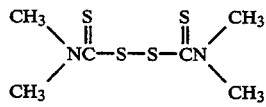

and the like with the rubber.

Tread rubber of tires for passenger cars and the like capable of running at a high speed requires a high grip property (increasing the coefficient of friction between a road surface and a tread). Therefore, a tread rubber having a large hysteresis loss is generally used.

However, this causes a generation of a large amount of heat in the tread rubber, as a consequence, the crosslinking of the tread rubber is broken resulting in a decomposition of the rubber components.

This decomposition results in the generation of foam to form a sponge-like mass and the tire is finally broken.

In addition, the resulting high temperature reduces the modulus of elasticity and the hardness of the rubber. As a result, running stability is disadvantageously disturbed and other undesirable phenomena occur.

It is known that when the above-described TMTD, TMTM (tetraethylthiuram monosulfide) or the like is used as a vulcanization accelerator for tread rubber, the above-described problems are solved (cf. Japanese Patent Application Laid-Open No. 48739/1987).

However, the above-described conventional rubber compositions do not satisfy each of the characteristics of vulcanization speed, processing stability, heat resistance and creep resistance to a sufficient extent.

Moreover, conventional tread rubber does not sufficiently meet high speed running stability as a result of even further high speed (for example, 200 km/hr. or more) used recently.

SUMMARY OF THE INVENTION

In view of the above-described problems, an object of the present invention is to provide a rubber compound capable of sufficiently satisfying all of the characteristics of vulcanization speed, processing stability, heat resistance and creep resistance, and a tire using this rubber composition as a tread with excellent high speed running stability.

An object of the invention is to provide a rubber compound which sufficiently satisfies all of the characteristics of vulcanization speed, processing stability, heat resistance and creep resistance, and provide a tire with excellent high speed running stability using the rubber composition as a tread.

It has now been found that the above-described object can be attained by using a combination of (i) a compound selected from the group consisting of particular thiuram compounds and particular dithiocarbamate compounds having the function of accelerating vulcanization, (ii) a guanidine type vulcanization accelerator, and (iii) a benzothiazole type vulcanization accelerator.

The present invention is described more specifically below.

The rubber composition according to the present invention comprises (a) 100 parts by weight of a rubber containing 60 parts by weight or more of a styrene-butadiene rubber (hereinafter referred to as "SBR"), (b) 20 to 180 parts by weight of a softening agent, (c) 0.5 to 5 parts by weight of at least one member selected from the group consisting of a thiuram compound of the following formula,

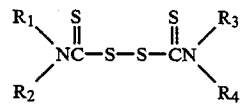

where $R_1, R_2, R_3$ and $R_4$ are independently selected from the group consisting of straight chain alkyl groups and branched chain alkyl groups having 7 to 12 carbon atoms, preferably 8 carbon atoms, and a dithiocarbamate compound of the following formula,

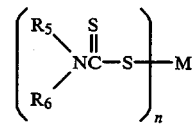

where $R_5$ and $R_6$ are independently selected from the group consisting of straight chain alkyl groups and branched alkyl groups having 7 to 12 carbon atoms, preferably 8 carbon atoms, M is a divalent or higher valent metal and n is a number which is the same as the number of the valence of the metal M, (d) 0.1 to 2.5 parts by weight of a guanidine type vulcanization accelerator, and (e) 0.5 to 5 parts by weight of a benzothiazole type vulcanization accelerator.

The weight ratio of the benzothiazole type vulcanization accelerator to at least one member selected from the group consisting of the thiuram compound and the dithiocarbamate compound is preferably 0.5 to 1.5.

DETAILED DESCRIPTION OF THE INVENTION

The present invention is explained in greater detail hereafter.

Each of $R_1$, $R_2$, $R_3$, $R_4$, $R_5$ and $R_6$ preferably is a 2-ethylhexyl group, M is antimony and n is 3. Suitable thiuram and dithiocarbamate compounds which can be used are known compounds.

The above-mentioned rubber composition can be used for various rubber products. In particular, it is preferable to use the rubber composition as a tread rubber for a tire. Examples include tires for passenger motor cars, bicycles, racing cars and the like.

The above-mentioned rubber composition may be produced by kneading using a mixer or kneader in a conventional manner. In production, there may be added, if desired, fillers such as carbon black, antioxidants, resins, stearic acid, vulcanization accelerators such as zinc oxide and the like, vulcanizers such as sulfur and the like, processing auxiliaries such as tackifiers and the like.

When the rubber composition is used as a tread rubber for a tire, the tire may be produced using conventional techniques for producing tires.

The amount of SBR is 60 parts by weight or more in the rubber to provide running stability when the rubber composition is used as a tread rubber. Where the amount of SBR is less than 60 parts by weight, operation stability is disadvantageously poor.

Examples of softening agents include aromatic oil, spindle oil, naphthenic oil, paraffinic oil, vegetable oil, factice and the like.

When a softening agent is present in an amount of less than 20 parts by weight, grip property is poor, for example, when the rubber composition is used as a tread rubber for a tire and when the amount exceeds 180 parts by weight, abrasion resistance is markedly deteriorated.

When a compound selected from the group consisting of the thiuram compound and the dithiocarbamate compound is present in an amount of less than 0.5 parts by weight, sufficient vulcanization density cannot be obtained, for example, when the rubber composition is used as a tire tread rubber. On the contrary, when the amount exceeds 5 parts by weight, the vulcanization density does not increase any further, and moreover, the compound is transferred to the adjacent rubber composition to affect adversely the adjacent rubber composition.

When the number of carbon atoms of $R_1, R_2, R_3$ or $R_4$ is 6 or less, dispersion of the compound in the rubber is poor and heat resistance and the like are also poor. When the number of carbon atoms is 13 or more, the vulcanization speed is markedly reduced.

In the same manner as above, when the number of carbon atoms of $R_5$ and $R_6$ is 6 or less, dispersion of the compound in the rubber is poor and heat resistance and the like are also poor. When the number of carbon atoms is 13 or more, vulcanization speed is considerably reduced.

Preferred examples of thiuram compounds suitable for use in the present invention include tetrakis 2-ethylhexyl thiuram disulfide, tetrakis 1-isopropylpentyl thiuram disulfide, tetrakis 1-ethyl-3-methylpentyl thiuram disulfide and tetrakis 1-ethylhexyl thiuram disulfide.

Examples of metals for M include antimony, iron, copper, zinc, nickel, lead, tellurium and the like. When M is monovalent, the vulcanization acceleration effect is not sufficient.

Guanidine type vulcanization accelerators include diphenylguanidine (DPG), di-o-tolylguanidine (DOTG), o-tolylguanidine (DTBG), di-o-tolylguanidine, dicatechol borate, and the like.

When the amount of guanidine type vulcanization accelerator is less than 0.1 part by weight, the vulcanization speed is so low that poor productivity arises. On the contrary, when the amount exceeds 2.5 parts by weight, processing stability is poor and scorching often occurs during processing.

Benzothiazole type vulcanization accelerators usable in the present invention include: mercaptobenzothiazole (MBT), dibenzothiazyl disulfide (MBTS), N-t-butyl-2-benzothiazolylsulfenamide (TBBS), N-cyclohexyl-2-benzothiazolylsulfenamide (CBS), N-oxydiethylene-2-benzothiazolylsulfenamide (MBS), N,N-dicyclohexyl-2-benzothiazolylsulfenamide (DCBS), zinc salt of mercaptobenzothiazole, 2-(4-morpholinodithio)benzothiazole, 2-(2,4-dinitrophenyl)mercaptobenzothiazole, cyclohexylamine salt of mercaptobenzothiazole, N,N-diethylthiocarbamoyl-2-benzothiazolylsulfide, and the like.

When the amount of the benzothiazole type vulcanization accelerator is less than 0.5 part by weight, sufficient vulcanization density is not obtained. On the contrary, when the amount exceeds 5 parts by weight, vulcanization density does not increase any further, and moreover, when the rubber containing such amount of a benzothiazole type vulcanization accelerator is used for a tire tread, it is transferred to and adversely affects an adjacent rubber composition. When the weight ratio of the benzothiazole type vulcanization accelerator to at least one member selected from the group consisting of the thiuram compound and the dithiocarbamate compound is less than 0.5, the effect in vulcanization density becomes small. Therefore, in order to obtain a desirable vulcanization density, a larger compounding amount is required.

As a result, superiority in processing stability is disadvantageously lowered.

When the ratio exceeds 1.5, in the same manner as above, the effect on vulcanization density becomes small. Therefore, in order to obtain a desirable vulcanization density, a larger compounding amount is required.

Further, superiority in heat resistance is disadvantageously reduced.

The accelerator compounds which can be used in this invention are well-known in the art as disclosed in U.S. Pat. Nos. 3,706,819; 3,400,106; and 3,910,864.

The present invention is explained in greater detail hereinafter by reference to specific examples, but the invention is not to be construed as being limited by the following examples. Unless otherwise indicated herein, all parts, percents and ratios are by weight.

REFERENCE EXAMPLE 1

Preparation of TEHT Used in EXAMPLE A Hereinafter

To a four-necked 500 ml flask were added 48.3 g of bis-2-ethylhexylamine, 17.0 g of 48% NaOH and 120 ml of water, then 16.2 g of carbon disulfide was dropwise added thereto over about one hour at 30°–40° C. After stirring the mixture at the same temperature for two hours additionally, a liquid mixture of 11.5 g of a 35% aqueous solution of hydrogen peroxide, 11.9 g of 95% sulfuric acid, and 30 ml of water was added dropwise at 30°–40° C. over about 2 hours followed by stirring for a further hour.

After completion of the reaction, 200 ml of toluene was added to the reaction system to form two phases and extract the end product. Specifically, the separated toluene phase was washed with water and the toluene was evaporated under reduced pressure. As a result, the end product, tetrakis 2-ethylhexyl) thiuram disulfide, 62.6 g (yield, 98.9%), was obtained.

EXAMPLE A

Examples 1–7, Comparative Examples 1–6

Tables 1A and 1B below show compounding ratios of rubber compositions, the physical properties of the rubber compositions and the like, and the characteristics of tires where the rubber compositions were used as the tread rubber.

In EXAMPLE A, TEHT, TOTD and TMTD (outside the scope of the present invention) were used as thiuram compounds, EH-Sb and EH-Zn were used as dithiocarbamate compounds, DPG was used as a guanidine type vulcanization accelerator and TBBS was used as a benzothiazole type vulcanization accelerator.

The weight ratio of benzothiazole type vulcanization accelerator (TBBS) to thiuram compound and/or dithiocarbamate compound (TBBS/(thiuram compound and/or dithiocarbamate compound)) was constant, that is, while the compounding ratios of thiuram compounds, dithiocarbamate compounds, guanidine type vulcanization accelerators and benzothiazole type vulcanization accelerators were varied, and, in accordance with the variation, the compounding ratio of the softening agents was also varied. This was done in order to evaluate properly the heat resistance and the creep resistance of the rubber without depending on the modulus elasticity.

The present invention achieves the intended object by using a compound selected from the group consisting of thiuram compounds and dithiocarbamate compounds, guanidine type vulcanization accelerators and benzothiazole type vulcanization accelerators in combination.

Therefore, for purposes of comparing with the Examples, the compounding in Comparative Example 1-3, 5 or 6 did not use any of these components and Comparative Example 4 used TMTD which is outside of the scope of the present invention as a thiuram compound.

The amount of TMTD is Comparative Example 4 was equimolar to that of TEHT of Example 1.

The testing methods used are described below.

Vulcanization Speed:

Measurement was effected at 155° C. using an oscillating disc rheometer manufactured by Japan Synthetic Rubber Co.

T90 in Table 1 stands for a time (unit: minute) necessary for obtaining 90% of the maximum torque value. The smaller the torque value, the higher the vulcanization speed. Therefore, a smaller value is preferred.

Processing Stability..

Measurement was effected at 130° C. using a Mooney viscometer manufactured by Shimazu Seisakusho. The testing method followed JIS K 6300 to determine T5 (unit: minute).

The larger the value of T5, the better the processing stability. Therefore, a larger value is preferred.

Heat Resistance:

Measurement was conducted following the method of ASTM-D-632-58 using a flexometer of the Goodrich type to determine the temperature (unit:° C.) where the sample blows out (rubber components are decomposed and foamed and become a sponge-like material) (blow-out point).

The larger the value, the better the heat resistance. Therefore, a larger value is preferred.

The measuring conditions were as shown below.

| Inner Temperature of Vessel | 120 C. |
|---|---|
| Number of Vibration | 1800 rpm |
| Load | 28 kg |
| Strain | 22.5% |
| Sample Size | 30 mm in diameter, 25.4 mm in height |

Creep Resistance:

Measurement was conducted at 200° C. using a TMA manufactured by Seiko Denshi K.K.. The sample had a cylindrical form of a diameter of 8 mm and a height of 6 mm, and the load was 50 g. The creep deformation amount (unit: %) after 20 minutes was determined.

The smaller the value, the better the creep resistance. Therefore, a smaller value is preferred.

Vulcanization Density:

Measurement was conducted following "Tension Test" of JIS K 6301 (Physical test method of vulcanized rubber). Dumbbell Type No. 3 sample was used and the modulus of elasticity at 300% elongation was defined as the vulcanization density. When a rubber composition is used as a tire tread, it is preferred for the value to be 150 or less.

High Speed Running Stability:

Tires where rubber compositions of the following Examples and Comparative Examples were used for the tread (size of tire: 205/60 R 15) were manufactured and installed to passenger motor cars. By running of the cars on a circuit at high speed, the tires were compared with a control tire where the rubber composition of Comparative Examples 4, 7 or 8 (infra) was used as tread with respect to driving characteristic, brakeage, handling response, road gripping characteristic upon steering, and control characteristic after exceeding the slip limit.

Synthetic evaluation was made based on feel.

The standard of evaluation was as shown below.

+1 → The feel was good to the extent that only professional test drivers can realize the good quality present as compared with a control tire.

+2 → The feel was good to the extent that skilled drivers of ordinary drivers can realize the good quality present.

+3 → The feel was good to the extent that even ordinary drivers can realize the good quality present.

−1 → The feel was bad to the extent that only professional test drivers can realize the inferior quality present as compared with a control tire.

−2 → The feel was bad to the extent that skilled drivers of ordinary drivers can realize the inferior quality present.

−3 → The feel was bad to the extent that even ordinary drivers can realize the inferior quality present.

TABLE 1A

| | Example 1 | Example 2 | Example 3 | Example 4 | Example 5 | Example 6 | Example 7 |
|---|---|---|---|---|---|---|---|
| SBR (TO120, manufactured by JAR) | 100 | 100 | 100 | 100 | 100 | 100 | 100 |
| Carbon Black Softening Agent | 100 | 100 | 100 | 100 | 100 | 100 | 100 |

TABLE 1A-continued

|  | Example 1 | Example 2 | Example 3 | Example 4 | Example 5 | Example 6 | Example 7 |
|---|---|---|---|---|---|---|---|
| Extended with oil | 37.5 | 37.5 | 37.5 | 37.5 | 37.5 | 37.5 | 37.5 |
| Added upon compounding | 62.5 | 112.5 | 0 | 62.5 | 62.5 | 62.5 | 62.5 |
| Stearic Acid | 2 | 2 | 2 | 2 | 2 | 2 | 2 |
| Antioxidant | 1 | 1 | 1 | 1 | 1 | 1 | 1 |
| Zinc Oxide | 3 | 3 | 3 | 3 | 3 | 3 | 3 |
| Thiuram Compound | | | | | | | |
| TEHT | 1 | 4 | 0.5 | | | | 0.5 |
| TOTD | | | | 1 | | | |
| TMTD | | | | | | | |
| Dithiocarbamate Compound | | | | | | | |
| EH-Sb | | | | | 1 | | 0.5 |
| EH-Zn | | | | | | 1 | |
| Guanidine Type Vulcanization Accelerator DPG | 0.5 | 0.5 | 0.5 | 0.5 | 0.5 | 0.5 | 0.5 |
| Benzothiazole Type Vulcanization Accelerator TBBS | 1 | 4 | 0.5 | 1 | 1 | 1 | 1 |
| Sulfur | 1.5 | 1.5 | 1.5 | 1.5 | 1.5 | 1.5 | 1.5 |
| TBBS/(Thiuram compound and/or dithiocarbamate compound) | 1 | 1 | 1 | 1 | 1 | 1 | 1 |
| Vulcanization Speed T90 | 16.8 | 20.2 | 15.7 | 16.2 | 15.8 | 16.3 | 16.2 |
| Processing Stability T5 | 15.5 | 22.3 | 13.8 | 15.3 | 16.0 | 15.9 | 15.7 |
| Heat Resistance | 245 | 245 | 250 | 246 | 248 | 252 | 245 |
| Creep Resistance | 1.69 | 1.70 | 1.65 | 1.68 | 1.65 | 1.67 | 1.65 |
| Vulcanization Density | 75 | 72 | 80 | 77 | 78 | 82 | 77 |
| High Speed Running Stability | +2.2 | +1.7 | +2.0 | +2.2 | +2.4 | +2.1 | +2.4 |

TABLE 1B

|  | Comp. Example 1 | Comp. Example 2 | Comp. Example 3 | Comp. Example 4 | Comp. Example 5 | Comp. Example 6 |
|---|---|---|---|---|---|---|
| SBR (TO120, manufactured by JSR) | 100 | 100 | 100 | 100 | 100 | 100 |
| Carbon Black | 100 | 100 | 100 | 100 | 100 | 100 |
| Softening Agent | | | | | | |
| Extended with oil | 37.5 | 37.5 | 37.5 | 37.5 | 37.5 | 37.5 |
| Added upon compounding | 62.5 | 62.5 | 62.5 | 62.5 | 62.5 | 62.5 |
| Stearic Acid | 2 | 2 | 2 | 2 | 2 | 2 |
| Antioxidant | 1 | 1 | 1 | 1 | 1 | 1 |
| Zinc Oxide | 3 | 3 | 3 | 3 | 3 | 3 |
| Thiuram Compound | | | | | | |
| TEHT | 1.25 | 2 | | | | |
| TOTD | | | | | | |
| TMTD | | | | 0.38 | | |
| Dithiocarbamate Compound | | | | | | |
| EH-Sb | | | | | 1.25 | 2 |
| EH-Zn | | | | | | |
| Guanidine Type Vulcanization Accelerator DPG | | 0.5 | 0.5 | 0.5 | | 0.5 |
| Benzothiazole Type Vulcanization Accelerator TBBS | 1.25 | | 2 | 1 | 1.25 | |
| Sulfur | 1.5 | 1.5 | 1.5 | 1.5 | 1.5 | 1.5 |
| TBBS/(Thiuram compound and/or dithiocarbamate compound) | | | | | | |
| Vulcanization Speed T90 | 20.4 | 16.5 | 22.2 | 15.0 | 21.0 | 16.5 |
| Processing Stability T5 | 34.1 | 16.0 | 24.3 | 10.6 | 33.3 | 15.8 |
| Heat Resistance | 225 | 230 | 217 | 237 | 226 | 229 |
| Creep Resistance | 2.20 | 2.05 | 2.27 | 1.90 | 2.03 | 2.02 |
| Vulcanization Density | 60 | 66 | 56 | 77 | 63 | 68 |
| High Speed Running Stability | −1.3 | −1.0 | −2.8 | control | −1.0 | −1.1 |

Explanation of Abbreviations

TEHT: tetrakis 2-Ethylhexyl thiuram disulfide

TOTD: Tetra-n-octyl thiuram disulfide
TMTD: Tetraethyl thiuram disulfide
EH-Sb: Antimony di-2-ethylhexyl dithiocarbamate
EH-Zn: Zinc di-2-ethylhexyl dithiocarbamate
DPG : Diphenylguanidine
TBBS: N-t-Butylbenzothiazolyl sulfenamide As is clear from the above, the rubber compositions of Examples 1–7 exhibit simultaneously high vulcanization speed, excellent processing stability, and further have excellent heat resistance, creep resistance and vulcanization density.

On the contrary, the rubber compositions according to Comparative Examples 1–3, 5 and 6 exhibit very poor vulcanization speed, heat resistance and creep resistance.

Comparative Example 4 shows that when TMTD outside of the scope of the present invention is used as a thiuram compound and is further mixed with a guanidine type vulcanization accelerator and a benzothiazole type vulcanization accelerator, the vulcanization speed and vulcanization density were at the levels similar to those of examples of the present invention, but the processing stability, heat resistance, and creep resistance were poor.

When the rubber compositions according to Examples 1 and 3–7 were used for a tire tread, the high speed running stability was quite excellent as compared with that of Comparative Example 4.

The tire where the rubber composition according to Comparative Example 3 was used for a tire tread exhibits very poor high speed running stability as compared with even Comparative Example 4 (control) where TMTD was used, and therefore, it is clear that the rubber composition is not suitable for a tire tread.

EXAMPLE B

Examples 1, 8–10, 5, 11 and 12.

Table 2 shows, in a manner similar to above, the compounding ratios of rubber compositions, physical properties of the rubber compositions, and the characteristics of tires where the rubber compositions were used as a tread rubber.

In EXAMPLE B, TEHT was used as a thiuram compound, EH-Sb was used as a dithiocarbamate compound, and DPG and TBBS were used as a guanidine type vulcanization accelerator and a benzothiazole type vulcanization accelerator, respectively, in a manner similar to Example A.

In addition, the ratios of TBBS/TEHT and TBBS/EH-Sb were changed.

TABLE 2

|  | Example 1 | Example 8 | Example 9 | Example 10 | Example 5 | Example 11 | Example 12 |
|---|---|---|---|---|---|---|---|
| SBR (TO120, manufactured by JSR) | 100 | 100 | 100 | 100 | 100 | 100 | 100 |
| Carbon Black | 100 | 100 | 100 | 100 | 100 | 100 | 100 |
| Softening Agent |  |  |  |  |  |  |  |
| Extended with oil | 37.5 | 37.5 | 37.5 | 37.5 | 37.5 | 37.5 | 37.5 |
| Added upon compounding | 62.5 | 62.5 | 62.5 | 62.5 | 62.5 | 62.5 | 62.5 |
| Stearic Acid | 2 | 2 | 2 | 2 | 2 | 2 | 2 |
| Antioxidant | 1 | 1 | 1 | 1 | 1 | 1 | 1 |
| Zinc Oxide | 3 | 3 | 3 | 3 | 3 | 3 | 3 |
| Thiuram Compound |  |  |  |  |  |  |  |
| TEHT | 1 | 1.25 | 0.8 | 0.5 |  |  |  |
| TOTD |  |  |  |  |  |  |  |
| TMTD |  |  |  |  |  |  |  |
| Dithiocarbamate Compound |  |  |  |  |  |  |  |
| EH-Sb |  |  |  |  | 1 | 1.25 | 0.8 |
| EH-Zn |  |  |  |  |  |  |  |
| Guanidine Type Vulcanization Accelerator DPG | 0.5 | 0.5 | 0.5 | 0.5 | 0.5 | 0.5 | 0.5 |
| Benzothiazole Type Vulcanization Accelerator TBBS | 1 | 0.75 | 1.2 | 1.5 | 1 | 0.75 | 1.2 |
| Sulfur | 1.5 | 1.5 | 1.5 | 1.5 | 1.5 | 1.5 | 1.5 |
| TBBS/(Thiuram compound or dithiocarbamate compound) | 1 | 0.6 | 1.5 | 3 | 1 | 0.6 | 1.5 |
| Vulcanization Speed T90 | 16.8 | 15.8 | 17.5 | 18.6 | 15.8 | 15.0 | 16.9 |
| Processing Stability T5 | 15.5 | 14.7 | 17.3 | 20.3 | 16.0 | 14.7 | 17.1 |
| Heat Resistance | 245 | 250 | 243 | 240 | 248 | 250 | 242 |
| Creep Resistance | 1.69 | 1.66 | 1.72 | 1.77 | 1.65 | 1.60 | 1.69 |
| Vulcanization Density | 75 | 77 | 74 | 75 | 78 | 81 | 75 |
| High Speed Running Stability | +2.2 | +2.4 | +1.5 | +0.8 | +2.4 | +2.7 | +1.0 |

As mentioned above, when the ratio of TBBS/TEHT or TBBS/EH-Sb exceeds 1.5, the processing stability, vulcanization density and high speed running stability were excellent, but the vulcanization speed was somewhat slow and improvements in heat resistance and creep resistance were not quite as good.

On the contrary, when the ratio was within the range of 0.5 to 1.5, rubbers were obtained having high vulcanization speed, excellent processing stability with good heat resistance, creep resistance and vulcanization density.

In addition, when rubber compositions of according to Examples 1, 8, 5 and 11 were used for a tire tread, the high speed running stability of each of the tires was very good as compared with that of Comparative Example 4 (control).

EXAMPLE C

Examples 13, 14 Comparative Example 7

Table 3 shows, in the same manner as above, the compounding ratios of rubber compositions, physical properties of the rubber compositions and characteristics of tires where the rubber compositions were used as a tread rubber.

EXAMPLE C used TEHT and TMTD (outside of the scope of the present invention) as thiuram compounds, EH-Sb as a dithiocarbamate compound, and DPG and TBBS as a guanidine type vulcanization accelerator and a benzothiazole type vulcanization accelerator, respectively, in the same manner as in EXAMPLES A and B.

SBR and natural rubber (NR) were compounded as rubber components.

TABLE 3

| | Example 13 | Example 14 | Comparative Example 7 |
|---|---|---|---|
| SBR (TO120, manufactured by JSR) | 80 | 80 | 80 |
| NR | 20 | 20 | 20 |
| Carbon Black | 80 | 80 | 80 |
| Softening Agent | | | |
| Extended with oil | 30 | 30 | 30 |
| Added upon compounding | 20 | 20 | 20 |
| Stearic Acid | 2 | 2 | 2 |
| Antioxidant | 1 | 1 | 1 |
| Zinc Oxide | 3 | 3 | 3 |
| Thiuram Compound | | | |
| TEHT | 1 | | |
| TOTD | | | |
| TMTD | | | 0.38 |
| Dithiocarbamate Compound | | | |
| EH-Sb | | 1 | |
| EH-Zn | | | |
| Guanidine Type Vulcanization Accelerator | 0.5 | 0.5 | 0.5 |
| DPG | | | |
| Benzothiazole Type Vulcanization Accelerator | 1 | 1 | 1 |
| TBBS | | | |
| Sulfur | 1.5 | 1.5 | 1.5 |
| TBBS/(Thiuram compound or dithiocarbamate compound) | 1 | 1 | |
| Vulcanization Speed T90 | 12.5 | 11.7 | 10.4 |
| Processing Stability T5 | 14.0 | 13.2 | 8.9 |
| Heat Resistance | 255 | 257 | 245 |
| Creep Resistance | 1.5 | 1.50 | 1.83 |
| Vulcanization Density | 125 | 128 | 128 |
| High Speed Running Stability | +1.8 | +2.0 | control |

As mentioned above, according to the compounding of Examples 13 and 14, rubber compositions were obtained having high vulcanization speed, excellent processing stability, good heat resistance and creep resistance and the like. In Comparative Example 7, the rubber composition contained TMTD as the thiuram type accelerator, but the processing stability was insufficient and the creep resistance was poor.

When the rubber compositions of the present invention were used for a tire tread, high speed running stability was very good as compared with that of Comparative Example 7 (control).

EXAMPLE D

Examples 15, 16 and Comparative Example 8

Table 4 shows, in the same manner as above, compounding ratios of rubber compositions, the physical properties of the rubber compositions and characteristics of tires where the rubber compositions were used as the tread rubber.

SBR 60 parts by weight and butadiene rubber (BR) 40 parts by weight were compounded in EXAMPLE D. MBTS was used as a benzothiazole type vulcanization accelerator.

TABLE 4

| | Example 15 | Example 16 | Comparative Example 8 |
|---|---|---|---|
| SBR (TO120, manufactured by JSR) | 60 | 60 | 60 |
| BR (BR01, manufactured by JSR) | 40 | 40 | 40 |
| Carbon Black | 100 | 100 | 100 |
| Softening Agent | | | |
| Extended with oil | 22.5 | 22.5 | 22.5 |
| Added upon compounding | 17.5 | 17.5 | 17.5 |
| Stearic Acid | 2 | 2 | 2 |
| Antioxidant | 1 | 1 | 1 |
| Zinc Oxide | 3 | 3 | 3 |
| Thiuram Compound | | | |
| TEHT | 1.5 | | |
| TOTD | | | |
| TMTD | | | 0.57 |
| Dithiocarbamate Compound | | | |
| EH-Sb | | 1.5 | |
| EH-Zn | | | |
| Guanidine Type Vulcanization Accelerator | 0.2 | 0.2 | 0.2 |
| DPG | | | |
| Benzothiazole Type Vulcanization Accelerator | 1.0 | 1.0 | 1.0 |
| MBTS | | | |
| Sulfur | 1.5 | 1.5 | 1.5 |
| MBTS/(Thiuram compound or dithiocarbamate compound) | 0.67 | 0.67 | |
| Vulcanization Speed T90 | 9.3 | 8.8 | 6.5 |
| Processing Stability T5 | 12.4 | 11.7 | 9.7 |
| Heat Resistance | 305 | 305 | 294 |
| Creep Resistance | 1.78 | 1.82 | 2.01 |
| Vulcanization Density | 133 | 134 | 135 |
| High Speed Running Stability | +2.1 | +2.0 | control |

MBTS stands for dibenzothiazyl disulfide.

In the above cases, it is clear that when the above-described thiuram compounds or dithiocarbamate compound, guanidine type vulcanization accelerators and benzothiazole type vulcanization accelerator are compounded, together rubber compositions having high vulcanization speed, excellent processing stability, heat resistance, good creep resistance, and high vulcanization density can be obtained.

Comparative Example 8 shows a rubber composition where TMTD was used as a thiuram compound and in this case, the processing stability was insufficient and the heat resistance and creep resistance were poor.

When rubber compositions in Examples 15 and 16 were used for a tire tread, the high speed running stability of each of them was quite excellent in comparison with that in Comparative Example 8 (control).

As explained above, according to the present invention, particular thiuram compounds and/or particular dithiocarbamate compounds are used in combination with guanidine type vulcanization accelerators and benzothiazole type vulcanization accelerators at particular compounding ratios. As a result, rubber compositions capable of sufficiently satisfying the desired vulcanization speed, processing stability, heat resistance, creep resistance and vulcanization density all in combination can be achieved, and moreover tires with excellent high speed running stability can be produced using the rubber compositions for a tire tread.

Further, the tires of the present invention provide a running stability even at high speed running, for example, 200 km/hr. or more, and in addition, high speed durability can be attained which is attributable to the heat resistance and the like achieved.

What is claimed is:

1. A rubber composition which comprises:
   (1) 100 parts by weight of a rubber containing 60 parts by weight or more of styrene-butadiene rubber,
   (2) 20 to 180 parts by weight of a softening agent,
   (3) 0.5 to 5 parts by weight of at least one member selected from the group consisting of a thiuram compound of the following formula:

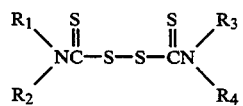

wherein $R_1$, $R_2$, $R_3$ and $R_4$ are independently selected from the group consisting of straight chain alkyl groups and branched chain alkyl groups having 7 to 12 carbon atoms, and a dithiocarbamate compound of the following formula:

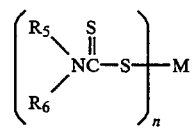

wherein $R_5$ and $R_6$ are independently selected from the group consisting of straight chain alkyl groups and branched alkyl groups having 7 to 12 carbon atoms, M is a divalent or higher valent metal and n is a number which is the same as the number of the valence of the metal M,
   (4) 0.1 to 2.5 parts by weight of a guanidine vulcanization accelerator, and
   (5) 0.5 to 5 parts by weight of a benzothiazole vulcanization accelerator, wherein the weight ratio of the benzothiazole vulcanization accelerator to the at least one member selected from the group consisting of the thiuram compound and the dithiocarbamate compound is 0.5:1 to 1.5:1.

2. The rubber composition according to claim 1, wherein each of $R_1$, $R_2$, $R_3$, $R_4$, $R_5$ and $R_6$ is a 2-ethylhexyl group, M is antimony and n is 3.

3. The rubber composition according to claim 1, wherein the softening agent is an aromatic oil, spindle oil, naphthenic oil, paraffinic oil, vegetable oil or factice.

4. The rubber composition according to claim 1, wherein M is antimony, iron, copper, zinc, nickel, lead or tellurium.

5. The rubber composition according to claim 1, wherein said guanidine vulcanization accelerator is diphenylguanidine, di-o-tolylguanidine, o-tolylguanidine, di-o-tolylguanidine or dicathecol borate.

6. The rubber composition according to claim 1, wherein the benzothiazole vulcanization accelerator is mercaptobenzothiazole, dibenzothiazyl disulfide, N-t-butyl-2-benzothiazolylsulfenamide, N-cyclohexyl-2-benzothiazolylsulfenamide, N-oxydiethylene-2-benzothiazolylsulfenamide, N,N-dicyclohexyl-2-benzothiazolylsulfenamide, zinc salt of mercaptobenzothiazole, 2-(4-morpholinodithio)benzothiazole, 2-(2,4-dinitrophenyl)mercaptobenzothiazole, cyclohexylamine salt of mercaptobenzothiazole or N,N-diethylthiocarbamoyl-2-benzothiazolyl sulfide.

* * * * *